United States Patent [19]
Mazet

[11] Patent Number: 6,109,128
[45] Date of Patent: Aug. 29, 2000

[54] GEARBOX WITH SYNCHRONIZED REVERSE GEAR FOR MOTOR VEHICLES

[75] Inventor: Stephane Mazet, Levailois Perret, France

[73] Assignees: Automobiles Peugeot, Paris; Automobiles Citroën, Neuilly sur Seine, both of France

[21] Appl. No.: 09/331,866

[22] PCT Filed: Oct. 27, 1998

[86] PCT No.: PCT/FR98/02292

§ 371 Date: Aug. 23, 1999

§ 102(e) Date: Aug. 23, 1999

[87] PCT Pub. No.: WO99/23400

PCT Pub. Date: May 14, 1999

[30] Foreign Application Priority Data

Oct. 31, 1997 [FR] France .................................. 97 13679

[51] Int. Cl.[7] .............................. F16H 3/089; F16D 23/06
[52] U.S. Cl. .......................................... 74/339; 192/53.35
[58] Field of Search ............................ 74/339; 192/53.35

[56] References Cited

U.S. PATENT DOCUMENTS 4,246,993  1/1981  Morscheck ............................ 192/53 F
4,640,141  2/1987  Knödel et al. ............................ 74/357
4,998,445  3/1991  Fujiwara .................................. 74/339
5,934,142  8/1999  Wagoner .................................. 74/339

*Primary Examiner*—Dirk Wright
*Attorney, Agent, or Firm*—Pollock Vande Sande & Amernick

[57] ABSTRACT

A gearbox with a transmission input shaft and an output shaft mounted parallel in a gearbox housing and includes several pairs of engaged pinions to shift in a corresponding number of forward transmission ratios. A reverse gear axle is mounted in the housing parallel to the input and output shafts, with two idler gears freely rotatable on the shaft, one gear engaging a fixed gear on the input shaft, the other engaging a fixed gear on the output shaft. A reverse synchronizing device is located between the two idler gears for engaging reverse gear ratio. The synchronizer includes a jaw clutching sleeve splined to one of the idler gears, and is slidable towards the other idler gear to actuate a synchronizing clutch. The clutch has radially inward facing champfered blockers which engage corresponding slots in the sleeve. A syncronization initiation device in the form of a snap ring is also provided.

11 Claims, 3 Drawing Sheets

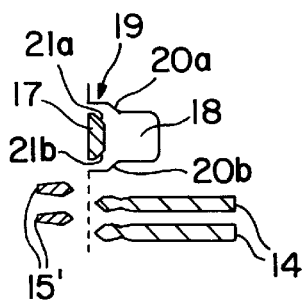
FIG. 5A
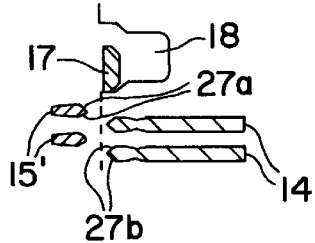
FIG. 5B
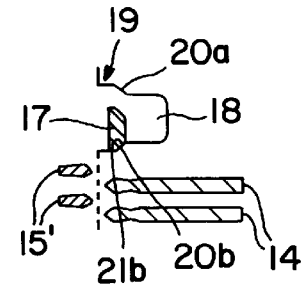
FIG. 5C
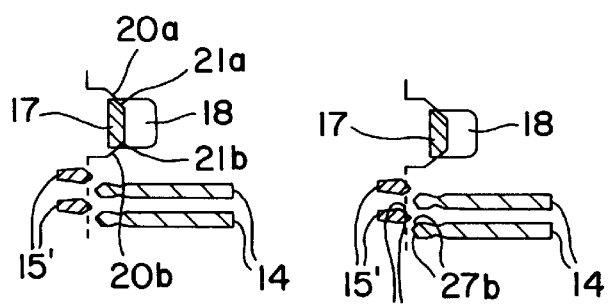
FIG. 5D
FIG. 5E

GEARBOX WITH SYNCHRONIZED REVERSE GEAR FOR MOTOR VEHICLES

FIELD OF THE INVENTION

This invention relates to a gearbox with synchronized reverse gear for motor vehicles.

BACKGROUND OF THE INVENTION

It concerns, more particularly, a pinion gearbox, as described, for example, in document U.S. Pat. No. 4,640,141, in a transversal position comprising a transmission input shaft and an output shaft mounted mutually parallel in the gearbox housing and comprising several pairs of engaged pinions to shift on a corresponding number of headway transmission ratios, and a reverse gear axle, parallel to the transmission input and output shafts, whereon are arranged (a) two idler wheels, rotating freely against each other whereof one is engaged in a fixed pinion on the transmission input shaft and the other is engaged in a fixed pinion on the output shaft, and (b) a synchronizing device arranged between the idler wheels ensuring between them a permanent connection.

Such a gearbox design has the advantage of not being very cumbersome for a gearbox consisting of two main shafts. However, the reverse synchronizing devices known to date and of such a design are either fast but too cumbersome, or not very cumbersome but not fast enough, or yet fast and not very cumbersome but with significant effect at the clutch level and a high level of noise.

SUMMARY OF THE INVENTION

The object of the invention is to overcome these drawbacks by proposing, for a gearbox as described above, a reverse synchronization device that is not very cumbersome, is fast and makes it possible to engage the reverse gear without clutch grabbing and without noise.

With this end in view, the object of this invention is a gearbox with a synchronized reverse gear, in particular for motor vehicles, comprising a transmission input shaft and an output shaft mounted mutually parallel in the gearbox housing and comprising several pairs of pinions engaged to shift on a corresponding number of headway transmission ratios and a reverse gear axle parallel to the transmission input and output shafts, on which are arranged (a) two idler wheels rotating freely against each other, whereof one is engaged in a fixed pinion on the transmission input shaft and the other is engaged in a fixed pinion on the output shaft, and (b) a reverse gear synchronization device arranged between the idler wheels capable of ensuring between them a permanent connection. This device is remarkable in that it comprises (a) a jaw clutching sleeve coupled in rotation with one of the idler wheels and capable of moving axially by the action of a shift finger so as to engage the idler wheel with the wheel by coupling the sleeve inner gear teeth with the outer gear teeth of a jaw clutching ring integral with the idler wheel, and (b) a synchronizing ring coupled in rotation and arranged coaxial to the periphery of the sleeve, the latter being capable of moving axially relative to the synchronizing ring, the sleeve being equipped with a synchronization initiation system.

Furthermore, the gearbox of the invention comprises one or several of the following characteristics:

- the synchronizing ring is equipped with at least two lugs, perpendicular to the reverse gear shaft, that extend the side of the ring which faces the sleeve so as to cooperate respectively with a slot made axially on the latter;
- each of the slots on the sleeve has an opening whose width is greater than that of a lug to which it is connected by means of two inclined planes that create the synchronization ramps of the sleeve;
- each of the lugs is equipped on its side that faces the sleeve with two inclined planes that form the synchronization ramps of the ring that are capable of cooperating with the inclined planes of the sleeve;
- the ring comprises an outer conical surface that is capable of cooperating with a complementary conical surface on a part that protrudes axially from the wheel in the direction of the sleeve;
- on three of the sleeve's gear teeth placed at 120° in relation to the center of the sleeve, the synchronization initiation system respectively comprises an initiation ramp and a counter-ramp arranged axially on the tooth, and capable of cooperating with an elastic snap ring;
- the lugs are long enough to come in contact with the elastic snap ring during the axial movement of the sleeve;
- the ring comprises three lugs arranged at 120° in relation to its center;
- the ring comprises an outer diameter that is greater than the diameter of the inner teeth of the sleeve, thus making it possible to increase the synchronization speed of the gears of the two idler wheels.

BRIEF DESCRIPTION OF THE DRAWINGS

The above-mentioned characteristics of the invention, as well as others, will become clear upon reading the following description of an example while referring to the attached drawings, in which:

FIG. 5A, 5B, 5C, 5D and 5E are section views along line V—V of FIG. 2, illustrating the various phases of the reverse gear synchronization.

DESCRIPTION OF PREFERRED EMBODIMENT

Figure 1:
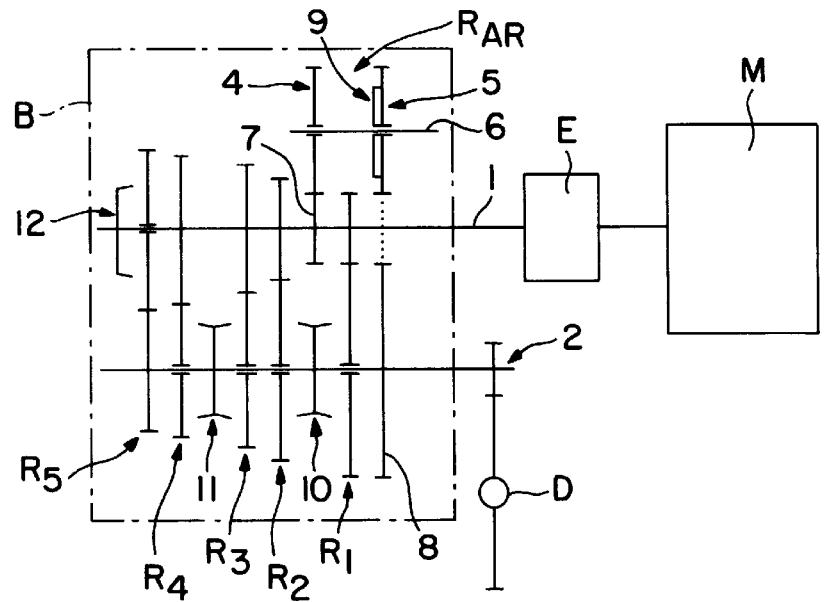
FIG. 1 is a schematic diagram of the design of the gearbox of in the invention.

FIG. 1 shows the overall transmission of a motor vehicle comprising an internal combustion motor M which is connected to the clutch input E et whose output is connected to the input of a gearbox B. The latter is connected at its output to the wheels of the car, (not shown) through a differential D, in order to convey the power to the motor M.

Conventionally, the gearbox comprises a transmission input shaft 1, connected to the clutch E output, and an output shaft 2 mounted mutually parallel in a gearbox housing 3.

Both the transmission input shaft 1 and the output shaft 2 comprise a plurality of pinions, thus forming several pairs of engaged pinions to shift on a corresponding number of a headway transmission ratio. Each pair of pinions is mounted on the appropriate shaft in such a way that one of the pinions is fixed and the other is idle.

The gearbox represented in FIG. 1, is equipped with five headway ratios $R_1$, $R_2$, $R_3$, $R_4$ and $R_5$, and a reverse gear ratio $R_{AR}$.

The reverse gear ratio $R_{AR}$ is reached by means of two idler wheels 4, 5 rotating freely against each other, arranged on an intermediate axle 6, designated as the reverse gear axle, parallel to the transmission input 1 and output 2 shafts.

One of the idler wheels 4 is engaged in a fixed pinion 7 on the transmission input shaft 1 forming a drive pinion during the $R_{AR}$ gear ratio, and the other idler wheel 5 is engaged in a fixed pinion 8, designated as reverse gear receiver pinion on the output shaft 2.

A synchronization device 9 is arranged between the two idler wheels 4, 5 so as to ensure between them a permanent connection thus allowing for the shifting of the reverse gear $R_{AR}$ ratio.

In a preferred embodiment of the invention, the fixed pinion of the pairs of pinions that create the first four headway gear ratios $R_1$, $R_2$, $R_3$, and $R_4$ is integral with the transmission input shaft 1, and the fixed pinion of the pair of the fifth headway gear ratio $R_5$ is integral with the output shaft 2.

Synchronization clutches 10, 11 and 12 are arranged around the idler pinions, respectively, clutches 10, 11 on the output shaft 2 between the first headway gear ratio $R_1$ and the second $R_2$ and between the third ratio $R_3$ and the fourth $R_4$ and clutch 12 at the end of the transmission input shaft 1.

Advantageously, the reverse gear drive pinion 7 is arranged between the pair of pinions that form the first headway ratio $R_1$ and the pair that forms the second ratio $R_2$.

Figure 2:
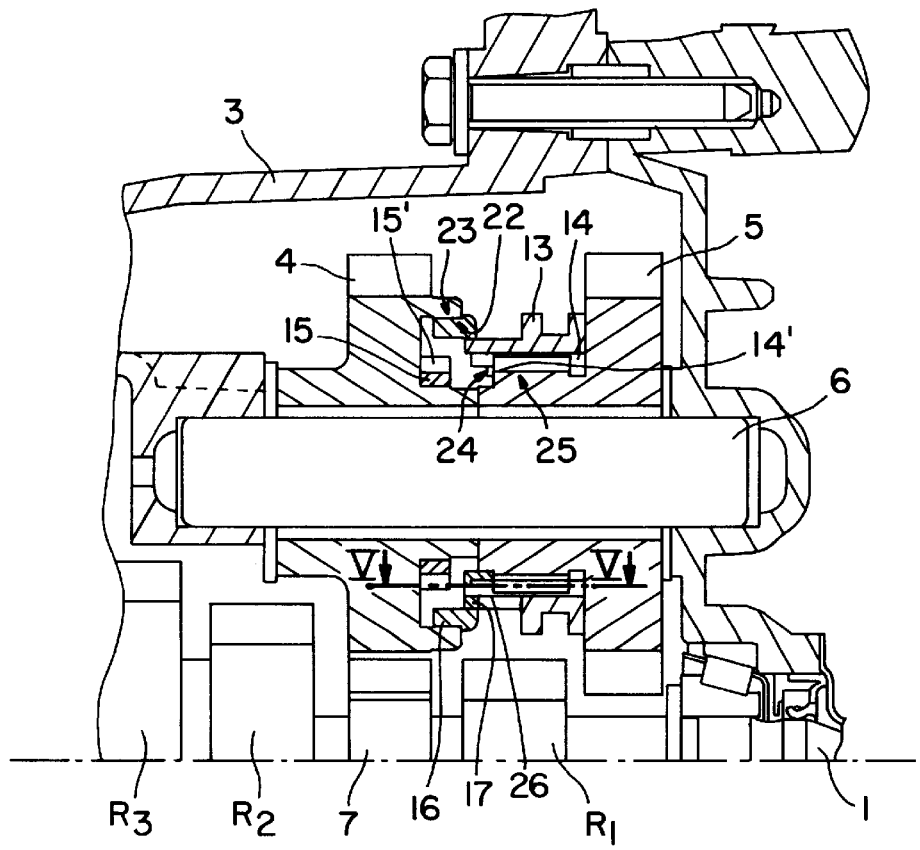
FIG. 2 is a longitudinal sectional view of the gearbox of in the invention in the synchronized reverse gear area.

As can be seen in FIG. 2, the reverse gear synchronization device comprises a jaw clutching sleeve 13 connected to one of the idler wheels 5 by means of a gear system 14 and 14', and capable of moving axially by the action of a shift finger (not shown), so as to engage the idler wheel 5 with the wheel 4 by coupling the inner gear teeth 14 of sleeve 13 with the outer gear teeth 15' or jaws of a jaw clutching ring 15 integral, in particular through soldering, with the idler wheel 4 that is engaged in the drive pinion 7.

It is possible to use other modes of connection between the jaw clutching ring 15 and the idler wheel 4, in particular by mounting the idler jaw clutching ring 15 on the reverse gear axle 6. This ring has splines or gear teeth on its outer periphery that will engage in the inner splines provided on the inner diameter of the wheel 4. The splines of the jaw clutching ring are larger than those of the wheel so as to be able to cooperate with the teeth or splines 14 of the sleeve. The wheel 4 is axially immobilized on the jaw clutching ring by a ring.

A synchronizing ring 16 designed to even the rotation speeds of the idler wheels 4, 5 before the clutching of the sleeve 13 with the ring 15, is arranged coaxial to the periphery of the sleeve 13 and coupled in rotation with the latter, but is capable of moving axially relative to the sleeve 13.

Figure 4:
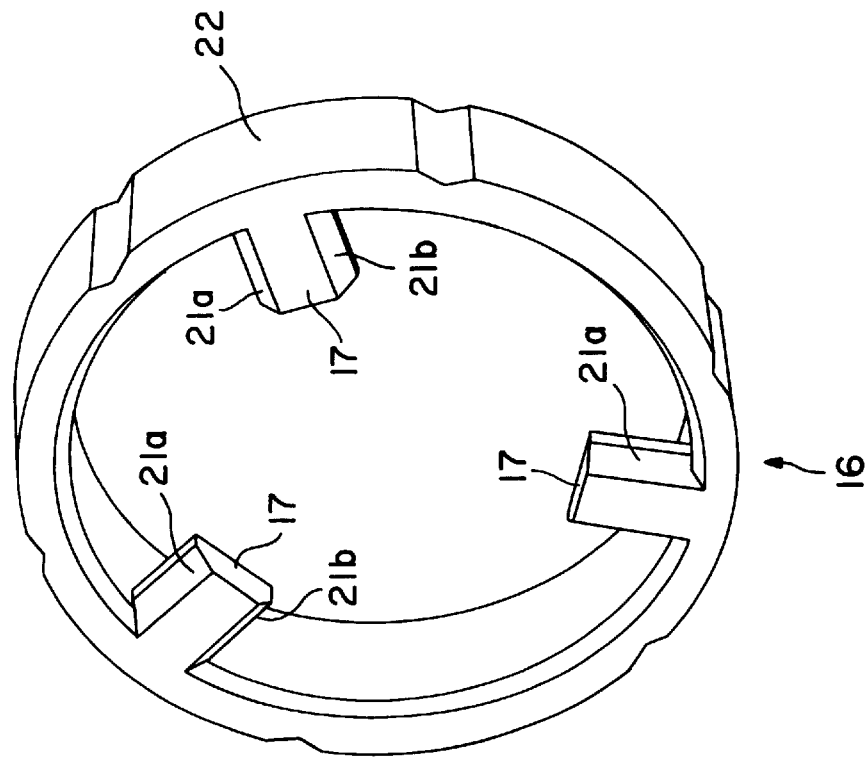
FIG. 4 is a perspective view of the synchronizing ring.
Figure 3:
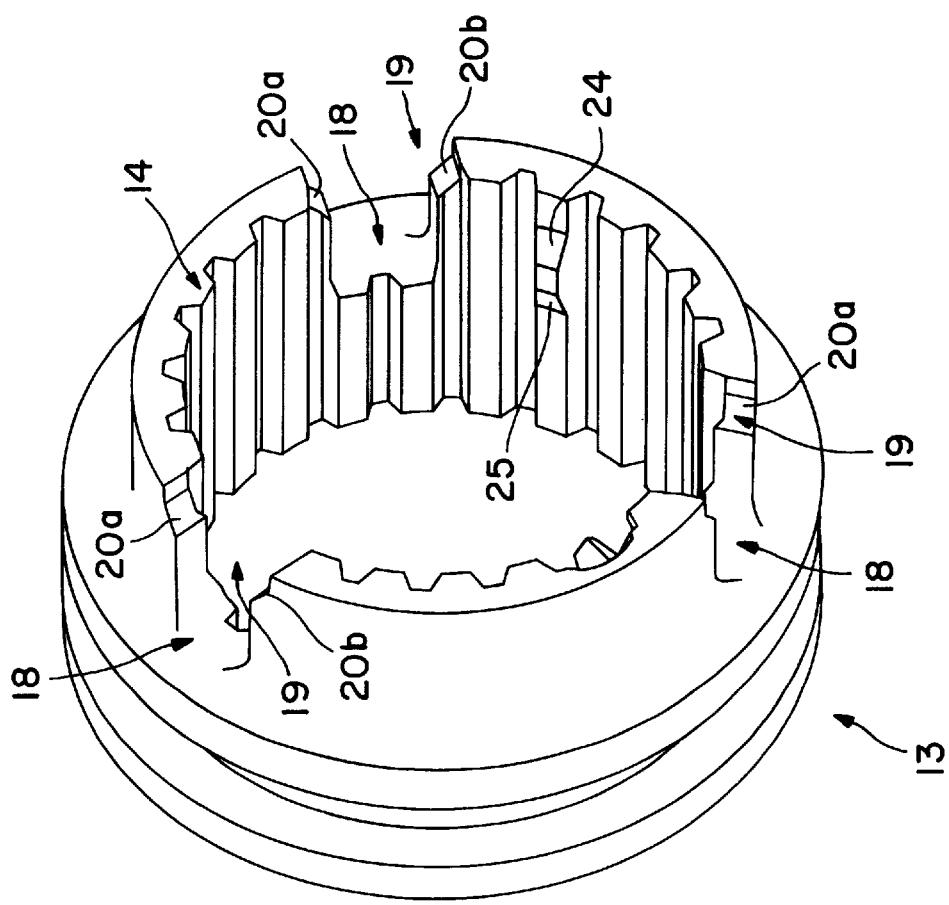
FIG. 3 is a perspective view of the synchronization sleeve of in the invention.

As can be seen in FIGS. 2, 3 and 4, this coupling in rotation is created by means of at least two lugs 17, perpendicular to the reverse gear shaft 6, that extend the side of the ring 16 facing the sleeve 13 so as to cooperate respectively with a slot 18 extending axially on the latter.

There are preferably three lugs 17, as can be seen on FIG. 4, and the latter are arranged at 120° relative to the center of the ring 16 and contained in the same plane.

Each of the slots 18 has an opening 19, visible in FIG. 3, whose width is greater than that of a lug 17, thus allowing for relative rotation between the ring 16 and the sleeve 13.

The opening 19 is connected to the slot 18 by means of two inclined planes 20a, 20b that form the synchronization ramps of the sleeve 13. These ramps cooperate with the two inclined planes 21a, 21b on each of the planes, facing the sleeve 13, of the lugs 17, thus creating the synchronization ramps of the ring 16.

The ring 16 consists of an outer conical surface 22 capable of cooperating with a complementary conical surface 23 created on a part that protrudes axially from the idler wheel 4, in the direction of the sleeve 13, as can be seen in FIG. 2.

Conventionally, the sleeve 13 is equipped with a synchronization initiation system that, on three of the sleeve 13 gear teeth on the idler wheel 5, placed at 120° relative to the center of the sleeve, comprises respectively an initiation ramp 24 and a counter-ramp 25 arranged axially on the tooth or spline 14 that are capable of cooperating with an elastic snap ring, visible in FIG. 2.

The operation of the reverse gear synchronization device will now be explained with reference to FIGS. 5A, 5B, 5C, 5D and 5E.

In FIG. A the synchronization device is represented in a neutral gear position, when the reverse gear is not engaged, and the idler wheel 4 meshes with the pinion 7 at a peripheral speed equal to that of the rotation speed of the transmission input shaft 1.

When the latter is put into gear, the sleeve 13 moves axially toward the left (with reference to FIG. 2, and the initiation ramp 24 then drives the elastic snap ring 26 in order to apply a flattening strain between the conical surfaces 22 and 23, of the ring 16 and the idler wheel 4, respectively.

As shown in FIG. 5B, relative compensation rotation of the ring 16, in relation to the sleeve 13, allows the latter to start evening the rotation speeds of the two idler wheels 4 and 5, by flattening the lugs 17 against one of the planes of the opening 19.

The movement of the sleeve then drives the gear synchronization phase of the wheels 4, 5 (FIGS. 5C and 5D), by friction clutch coupling of the synchronization ramps 21a, 21b of the ring 15 with the synchronization ramps 20a, 20b of the sleeve 13, where the lugs 17 are engaged in the slots 18. The rotation speed of the two wheels is then provided by the rotation speed of the reverse gear receptor pinion 8 of the output shaft 2.

This movement of the sleeve 13 also drives, through cooperation of the synchronization ramps 21b and 20b of the lugs 17 and the sleeve 13, respectively, the meshing of the lugs 17 in the slots 18, as can be seen in FIG. 5D.

Ring 16 has an outer diameter that is greater than the inner diameter of the sleeve 13 in order allow for an increase in speed of the gear synchronization of the two idler wheels 4 and 5.

Lastly, the jaw clutching phase, FIG. 5a, is carried out by coupling the teeth 15' and 14, of the ring 15 and the sleeve 13 respectively with inclined surfaces 27a and 27b in order make a mutual meshing easier, as can be seen on FIG. 5.

During this phase, the counter-ramp 25 frees the flattening strain between the conical surfaces 22 and 23 of the ring 16 and the wheel 4 respectively, exerted by the elastic snap ring 26.

Advantageously, the lugs 7 are long enough to come in contact with the elastic snap ring 26 during the movement of the sleeve 13 thus avoiding a residual initiation, in other words a flattening strain between the conical surfaces 22 and 25 during the jaw clutching phase, which is harmful to the reverse gear shifting.

We understand from reading the preceding description, that such a reverse gear synchronization device as set forth in this invention, makes it possible to have an optimal synchronizer cone diameter 22 in reduced overall dimensions and also to have a much reduced synchronization stroke due to the shape of the ring and the sleeve, thus allowing for fast reverse gear shifting and better shifting meaning without noise and without clutch grabbing.

Of course, the reverse gear synchronization device described above can be reversed, meaning the sleeve 13 can be connected to the idler wheel 4.

What is claimed is:

1. Gearbox with synchronized reverse gear, in particular for motor vehicles, comprising a transmission input shaft (1) and an output shaft (2) mounted mutually parallel in the gearbox housing (3) and comprising a plurality of pairs of engaged pinions to shift on a corresponding number of headway transmission ratios, and a reverse gear axle (6), parallel to said transmission input (1) and output shaft, whereon are arranged two idler wheels (4, 5) rotating freely against each other, one of said idler wheels (4) being engaged in a fixed pinion (7) on the transmission input shaft (1) of said idler wheels, and the other (5) of said idler wheels being engaged in a fixed pinion on said output shaft (2), and a reverse gear synchronizing device (9) arranged between the idler wheels and capable of ensuring between them a permanent connection, wherein the reverse gear synchronizing device (9) comprises a jaw clutching sleeve (13) coupled in rotation with one of said idler wheels (5) and capable of moving axially by the action of a shift finger so as to engage the one idler wheel (5) with the wheel (4) by coupling said inner gear teeth (14) of said sleeve (13) with outer gear teeth (15') of a jaw clutching ring (15) integral with the idler wheel (4) and synchronizing ring (16) coupled in rotation and arranged coaxial to a periphery of said sleeve (13), the latter being axially movable relative to the synchronizing ring and that said sleeve (13) being equipped with a synchronizing initiation system (24, 25).

2. The gearbox according to claim 1, wherein the synchronizing ring (16) is equipped with at least two lugs (17), perpendicular to the reverse gear shaft (6), that extend the plane of said ring (16) that faces the sleeve (13) so as to respectively cooperate with an axial slot (18) on the latter.

3. The gearbox according to claim 2, wherein each of the slots (18) of the sleeve (13) is provided with an opening (19), whose width is greater than that of a lug (17) connected to it by means of two inclined planes (20a, 20b) that form the synchronizing ramps of the sleeve (13).

4. The gearbox according to claim 3, wherein each of the lugs (17) is equipped on its side that faces the sleeve (13) with two inclined planes (21a, 21b) that constitute the synchronizing ramps of the ring (16) adapted to cooperate with the inclined planes (20a, 20b) of the sleeve (13).

5. The gearbox according claim 4, wherein the ring (16) comprises an outer conical surface (22) capable of cooperating with a complementary conical surface (23) on a part that protrudes axially from the idler wheel (4) in the direction of the sleeve (13).

6. The gearbox according to claim 1, wherein the synchronization initiation system on three gear teeth (14) of the sleeve (13), located at 120° relative to the center of the sleeve, respectively comprises an initiation ramp (24) and a counter-ramp (25) arranged axially on the tooth (14) and adapted to cooperate with an elastic snap ring (26).

7. The gearbox according to claim 6, wherein the lugs (17) are long enough to come in contact with the elastic snap ring (26) during the axial movement of the sleeve (13).

8. The gearbox according to claim 1, wherein the synchronizing ring (16) comprises three lugs (17) arranged at 120° relative to a center of said synchronizing ring.

9. The gearbox according to claim 1, wherein the synchronizing ring (16) comprises an outer diameter greater than the inner diameter of the sleeve (13), thus making it possible to increase the speed of the gear synchronization of the two idler wheels (4 and 5).

10. The gearbox according to claim 1, with five headway gear ratios, wherein the fixed pinion of the pairs of pinions that form the first four headway ratios is integral with the transmission input shaft (1) and that the fixed pinion of the pair of the fifth headway gear ratio is integral with the output shaft (2).

11. The gearbox according to claim 10, wherein the reverse gear drive pinion (7) is arranged between the pair of pinions that form the first headway gear ratio ($R_1$) and the pair of pinions that form the second ratio headway gear ($R_2$).

* * * * *